Figure 1:
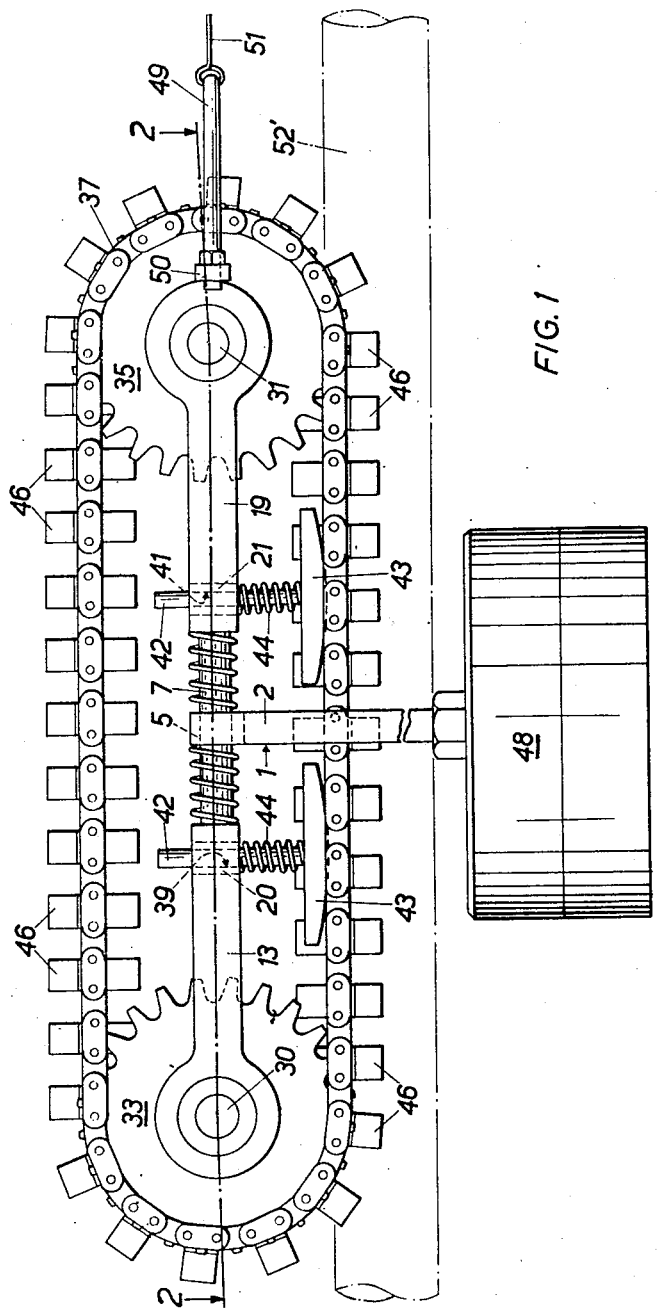

May 28, 1957  T. FINKELSTEIN  2,793,440
DEVICES FOR MEASURING THE LENGTH OF
CONTINUOUS LENGTHS OF MATERIAL
Filed Feb. 29, 1956  5 Sheets-Sheet 1

Inventor
Theodor Finkelstein.
By
Ferdinand Broster Boschardt
Attorney

May 28, 1957     T. FINKELSTEIN     2,793,440
DEVICES FOR MEASURING THE LENGTH OF
CONTINUOUS LENGTHS OF MATERIAL
Filed Feb. 29, 1956     5 Sheets-Sheet 4

Inventor
Theodor Finkelstein.
By
Ferdinand Broster Bosshardt
Attorney

May 28, 1957
T. FINKELSTEIN
2,793,440
DEVICES FOR MEASURING THE LENGTH OF
CONTINUOUS LENGTHS OF MATERIAL
Filed Feb. 29, 1956
5 Sheets-Sheet 5
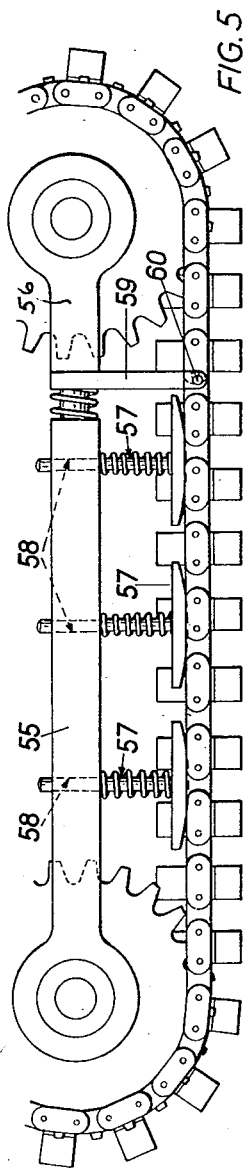
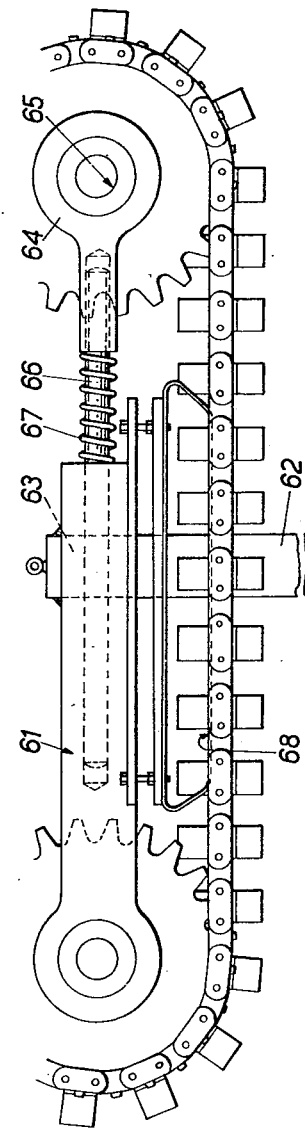
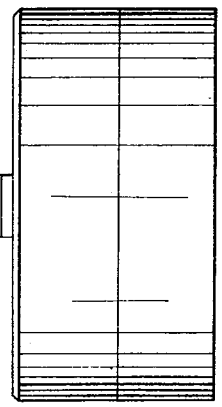
Inventor
Theodor Finkelstein
By
Ferdinand Broster Bosshardt
Attorney

United States Patent Office 2,793,440
Patented May 28, 1957

2,793,440

DEVICES FOR MEASURING THE LENGTH OF CONTINUOUS LENGTHS OF MATERIAL

Theodor Finkelstein, Ashton-under-Lyne, England, assignor to Glover Bros. (Mossley) Limited, Mossley, near Manchester, England Application February 29, 1956, Serial No. 568,614

Claims priority, application Great Britain March 26, 1955

4 Claims. (Cl. 33—134)

This invention relates to devices for measuring the length of continuous lengths of material.

Length-measuring devices for measuring the length of long uniform articles such as wires or cables wherein a measuring wheel runs in contact with the article and operates a measuring or counting device are already known. Such devices suffer from the disadvantage that due to the point or lateral line contact of the wheel with the article, a degree of slip can take place between the wheel and the article. Furthermore, if the article whose length is to be measured has a non-uniform surface, as for example a stranded wire rope, use of the device results in the wheel revolutions not accurately corresponding to the true length of the article. These disadvantages can lead to large errors of measurement when the length of a very long article is being measured.

Devices are also known in which a measuring member moves, in contact and together with the article to be measured along a straight path for a predetermined length.

According to the invention, a device for measuring the length of continuous lengths of material has a measuring member adapted to move along a path substantially parallel to the material being measured, the measuring member being provided with gripping means adapted to grip the material whilst being moved by the material in the said path.

The said measuring member may be endless.

The said measuring member may be an endless link chain running over sprocket wheels.

There are preferably two endless link chains, and the said gripping means preferably consists of a part which is connected to both chains.

There may be a plurality of the said parts, and each part may have portions which are convergent, and means may be provided for urging the said portions into engagement with the material, and/or the material into engagement with the said portions, so that the material is gripped by a wedging action.

The last-named means may include spring or other resilient means.

There are preferably two sprocket wheels for the or each chain, the or each two sprocket wheels being mounted so as to be resiliently urged away from one another so as to tension the chain running over them.

Preferably, the said parts are substantially V-shaped parts whose ends are each connected to one of the said link chains.

Each outer link of each link chain on opposed sides thereof preferably has one end of a said V-shaped part connected to it.

The chains preferably have the said V-shaped parts connected to them in such a manner that the apexes of the V-shaped parts are inwardly disposed, and the material is adapted to be gripped between the limbs of the V-shaped parts on the lower runs of the chains.

The material engaging surface or surfaces of the or each said part may be smooth, or alternatively may be covered by a resilient material, such as rubber or plastics, and/or have roughened or serrated engaging surfaces.

Alternatively, the said gripping means may be adapted to grip the material by having spring-urged jaws engageable with the material and disengageable by cam or other suitable means.

The said spring-urged jaws may be provided with toggle action spring means whereby the spring means serves also to complete the opening of the jaws and to hold them open after the jaws have been initially opened against the action of the spring means by the said cam or other means.

In the accompanying more or less diagrammatic drawings—

Figure 2:
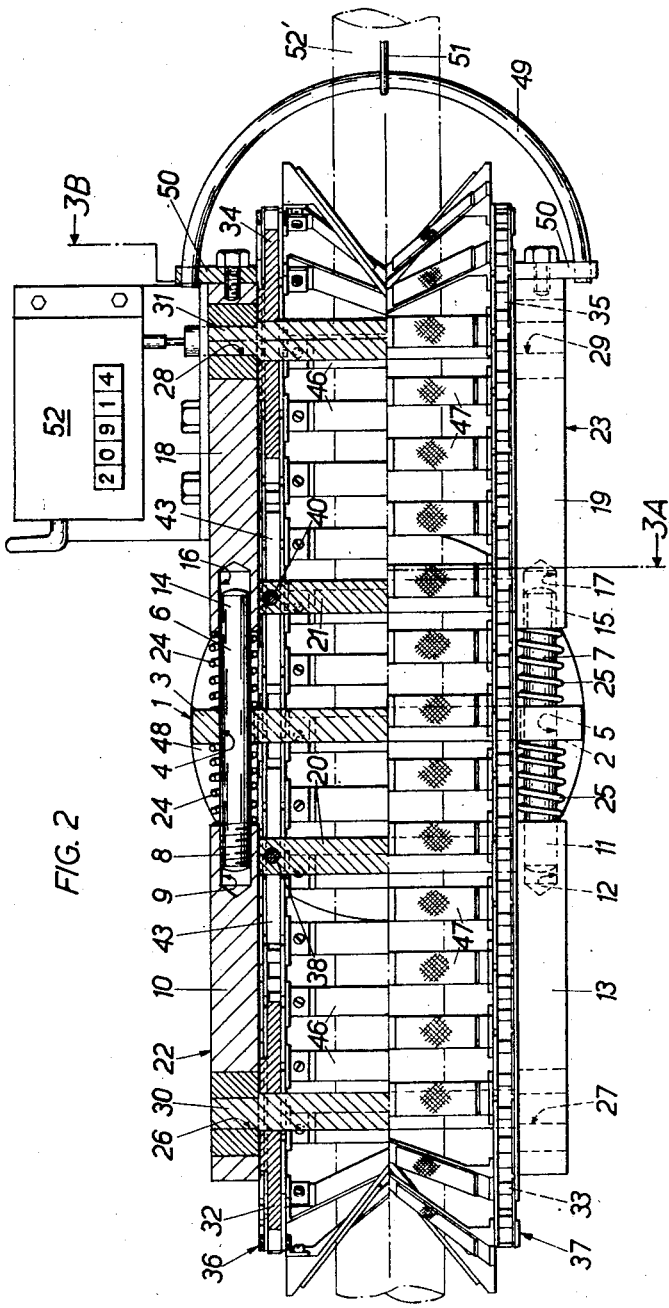
Figure 3:
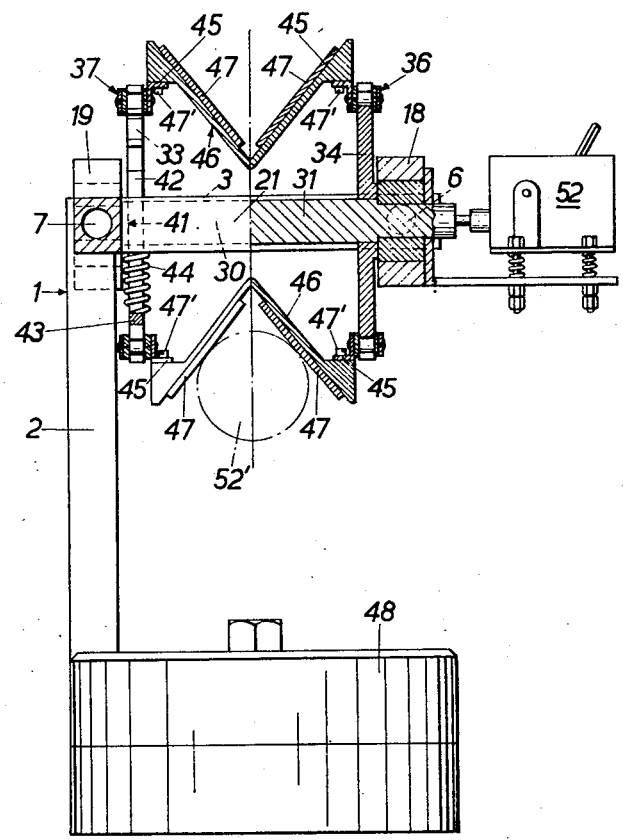
Figure 4:
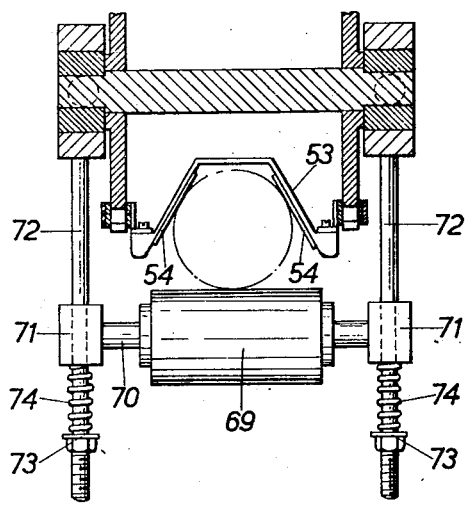
Figure 7:
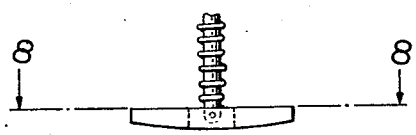
Figure 8:

Figure 1 is a fragmentary side elevation of a device for measuring the length of continuous lengths of material, Figure 2 is a plan view of the device shown in Figure 1, partly in section on line 2—2 of Figure 1, Figure 3 is a fragmentary end view thereof, partly in section on line 3A—3A of Figure 2, and partly in section on line 3B—3B of Figure 2, Figure 4 is an end view in section and illustrates other constructions, Figure 5 is a fragmentary side elevation and illustrates another construction, Figure 6 is a similar view to Figure 5 and illustrates further constructions, Figure 7 is a fragmentary side elevation of a detail, and illustrates a still further construction, and Figure 8 is a plan view of Figure 7, taken in section on line 8—8 of Figure 7.

Referring to the drawings, in the construction shown in Figures 1 to 3, as applied by way of example to a device for measuring the length of continuous lengths of material such as wire rope or cable, which may or may not be stranded, the device has a bracket 1 having an upright limb 2, the other limb 3 being at right angles to the limb 2 and provided with a lateral aperture 4 near the free end thereof, there being a lateral aperture 5 similar to the lateral aperture 4 at the junction of the limbs 2 and 3, the axes of the apertures 4 and 5 being parallel. The apertures 4 and 5 each provide a bearing for a guide rod 6 and 7 respectively, the guide rods 6 and 7 being a sliding fit in the apertures 4 and 5. One end 8 of the guide rod 6 is screw-threaded and is screwed into a screwthreaded hole 9 in the end of a bearing member 10. The corresponding end 11 of the guide rod 7 is also screwthreaded and is screwed into a screwthreaded hole 12 in the end of a bearing member 13. The other ends 14 and 15 of the guide rods 6 and 7 respectively are slidably engaged in holes 16 and 17 respectively in the ends of bearing members 18 and 19 respectively. The bearing members 10 and 13 are joined by a lateral cross member 20, and the bearing members 18 and 19 are joined by a lateral cross member 21, each forming a separate framework 22 and 23 respectively. Helical compression springs 24 and 25 are provided on the rods 6 and 7 respectively and disposed between the bracket 1 and each framework.

The bearing members 10 and 13 of the framework 22 are each provided at their outer ends with a bearing aperture 26 and 27 respectively, and the bearing members 18 and 19 of the framework 23 are each provided with a bearing aperture 28 and 29 respectively. The apertures 26 and 27 are in alignment, and the apertures 28 and 29 are in alignment. The apertures 26 and 27 of the framework 22 have a shaft 30 mounted in them, and the apertures 28 and 29 of the framework 23 have a shaft 31 mounted in them. The shaft 30 has two sprocket wheels 32, 33 fixed non-rotatably thereon. The shaft 31 has two sprocket wheels 34, 35 fixed non-rotatably thereon. Opposite pairs 32, 34 and 33, 35 of the sprocket wheels are aligned and the pair 32, 34 has an endless chain 36 mounted thereon, whilst the pair 33, 35 has an endless chain 37 mounted thereon, each chain running between the sprocket wheels of the corresponding pair. The chains 36, 37 are tensioned by means of the compression springs 24, 25, sliding movement of the guide rods 6 and 7 in the holes 16 and 17 in the framework 23 and in the apertures 4 and 5 of the limb 3 of the bracket 1 being possible with the compression springs 24 and 25 serving to urge the frameworks 22 and 23 away from one another. The lateral cross members 20, 21 are each provided with two spaced lateral apertures 38, 39 and 40, 41 respectively, whose axes are parallel and are at right angles to the axes of the holes 9, 12 and 16, 17 of the frameworks. Each of the apertures 38, 39, 40 and 41 has a rod 42 slidingly engaged in it, each rod 42 having a pad 43 secured to its lower end and furthermore having a helical compression spring 44 disposed between the corresponding cross member and the respective pad 43. The pads 43 are long compared with their width, and are arranged so that two pads are aligned longitudinally with one another and with the lower run of each chain so as to bear upon the chain, with each pad disposed between the link plates of the corresponding chain in engagement with the rollers thereof. The lower surface of each pad 43 is slightly convexly curved so as to assist in ensuring good engagement with the said rollers.

The chains 36, 37 each have inner and outer link plates, rollers and pivot pins. Each outer link plate on opposed sides of the chains is formed with a laterally projecting lug 45, see particularly Figure 3, and each lug 45 has one end of a V-shaped member 46 secured to it, by a screw 47' engaging an aperture in the lug and a screw-threaded hole in the corresponding end of the respective member 46, the members 46 extending between the chains 36 and 37 so as to join the same and furthermore having their apexes extending upwardly at the lower runs of the chains. Each member 46 has a strip 47 secured to the inner side of each limb thereof, each strip having a roughened or serrated outer surface. Alternatively, the strips 47 may have a smooth outer surface. The strips 47 may be of hard material, such as steel, or may be of resilient material, such as rubber or plastics.

The limb 2 of the bracket 1 has a weight 48 secured to it eccentrically so that the weight of the whole assembly is more or less evenly balanced substantially midway between the centre lines of the chain runs. The plane containing the apexes of the V-shaped members 46 is also substantially midway between the centre lines of the chain runs. A curved rail 49 has lugs 50 secured to its ends, the lugs 50 being bolted to the outer ends of the bearing members 18 and 19 respectively, and the whole assembly is steadied by means of a cord 51 fixed to a stationary object and looped around the curved rail 49. Where the device is employed for example to measure the length of stranded wire rope as the wire rope issues from the closing machine in which it is being produced, the ends of the cord 51 may be attached to suitable parts of the closing machine (not shown). The sprocket wheel shaft 31 has a revolution counter 52 operated by it either directly, as shown, or through suitable gearing so that the amount of travel of the chains can be read off from it directly in units and fractions of units of length.

The device is employed to measure the length of, for example, a stranded wire rope produced by a closing machine by being placed on the wire rope (shown in dot-and-dash lines and designated 52') as it issues from after having been produced by the closing machine, with the V-shaped members 46 of the lower runs of the chains 36, 37 lying over the wire rope, the wire rope supporting the device. The weight of the device causes the roughened surfaces of the strips 47 of the V-shaped members 46 to grip the wire rope by a wedging action and the spring-urged pads 43 serve to support the lower runs of the chains 36, 37 resiliently in position, whilst the compression springs 24, 25 of the guide rods 6, 7 serve to keep the chains 36, 37 in tension. Because the device is more or less evenly balanced about the axis of the wire rope, and because the centre of gravity of the device is arranged to be below the axis of the wire rope, the cord 51 is sufficient to steady it and to keep it floatingly in one position with respect to the closing machine. As the wire rope is produced by the closing machine, it is gripped by those of the members 46 which are disposed on the lower runs of the chains 36, 37 and its issuing movement is imparted to the members 46 thereby causing them and the chains 36, 37 to which they are attached to move in a direction parallel to the direction of movement of the wire rope. As the members 46 reach the end of the lower runs they become disengaged from the wire rope as the chains pass around the lagging pair of sprocket wheels 32 and 33, whilst members 46 which were previously disengaged from the wire rope as they traverse the upper runs become grippingly engaged with the wire rope as the chains pass around the lower part of the leading pair of sprocket wheels 34, 35. The chains 36, 37 together form a measuring member and are moved by the wire rope by amounts agreeing exactly with the amount of wire rope which has passed the device, and as the chains drive the sprocket wheels 32, 33, 34 and 35, the rotation of the sprocket wheel shaft 31 can be translated as hereinbefore stated into readings of the length of wire rope which has passed the device.

In another construction, shown in Figure 4, the device is similar to that hereinbefore described with reference to Figures 1 to 3 except that, in order to adapt the length measuring device for use in connection with relatively thick lengths of continuous material, for example cables and the like, members 53 connecting the chains are of truncated V-shape and the sides of the truncated V-shaped members 53 are correspondingly more separated to allow for wider material to be gripped between them. The truncated form of the members 53 when the sides are more separated are necessary to prevent their inwardly projecting portions from fouling as the chains pass round the sprockets. Strips 54 having roughened material-engaging surfaces and similar to the strips 47 of the hereinbefore described construction are secured to the members 53 as shown in Figure 4.

In a further construction, shown in Figure 5, the bearings for the sprocket wheel shafts, instead of being provided in two frameworks each of which has a pair of chain supporting pads, are provided in a main member 55 and an auxiliary member 56, the main member 55 being a long solid casting or thick plate and having the auxiliary member 56, which is shorter and generally narrower than the main member 55, slidably and resiliently mounted therein. The main member 55 has three pairs of chain supporting pads 57 (one of each pair being shown in Figure 5) resiliently mounted in apertures 58 in it. The auxiliary member 56 has two projections, one of which is shown in Figure 5 and designated 59, each projection 59 having an eye 60 for a steadying cord (not shown). The combined weight of the main and auxiliary members makes the provision of a separate weight unnecessary, the steadying cord attached to the projections 59 being so disposed as to prevent the assembly from rotation about the axis of a continuous length of material the length of which the device is adapted to measure. The sprocket wheels, chains and V-shaped or truncated V-shaped members are as hereinbefore described.

In a still further construction, shown in Figure 6, the construction is similar to the hereinbefore first-described construction except that there is only one framework, designated 61 in Figure 6, the framework 61 including a weight bearing bracket 62, which latter forms the cross member 63 thereof. Separate bearing members, one of which is shown in Figure 6 and designated 64, each have a bearing aperture 65 and each being mounted on a guide rod 66, each guide rod 66 being slidably mounted in the framework 61 and having a compression spring 67. Chain supporting pads are provided on the framework 61.

In any of the hereinbefore described constructions, the chain supporting pads, instead of being secured to their rods, may be, as shown in Figures 7 and 8, pivoted to them so that the pads can have a degree of pivotal movement in an upright plane.

In any of the hereinbefore described constructions, and as shown in Figure 6, the chain supporting pads, instead of being mounted on guide rods provided with compression springs, can themselves be of springy material, such as spring steel, and be bolted to one or both of the members having the sprocket wheel shaft bearing apertures. In the embodiment shown in Figure 6, there is one chain supporting pad 68 only for each lower chain run, and each pad 68 is of springy material and secured to the framework 61.

In still another construction, also shown in Figure 4, the amount of gripping pressure exerted by the device on the material to be measured can be obtained or augmented by means of spring loaded rollers. The axes of the rollers are parallel to the sprocket wheel shaft axes and the rollers are disposed beneath the lower run of the chains and spaced equally therealong. Each end roller is disposed with its axis beneath the axis of the corresponding sprocket wheel shaft. In the embodiment shown in Figure 4, which illustrates an end roller 69, there is a shaft 70 on which the roller 69 can rotate, the ends of the shaft 70 each being secured to a collar 71, and each collar being slidably mounted on a rod 72 one end of which is secured to the corresponding bearing member or framework of the device. Each rod is screwthreaded at its free end and has an adjustable stop 73, a compression spring 74 being disposed between each stop 73 and collar 71, the springs acting to urge the collars and therefore the roller towards the bearing members or framework. The rollers serve, as shown in Figure 4, to press the material to be measured into gripping engagement with the V-shaped members 53.

Where the path of the material being measured remains substantially the same, the device may be held in position by a bracket (not shown) pivoted or otherwise secured to a stationary object, instead of being held by a cord.

Instead of V-shaped or truncated V-shaped members, the chain link plates may be provided with circular, part circular or other concavely curved jaws closable on the material at the appropriate time by spring means and openable at the appropriate time by cam or other similar means. The spring means may act in the manner of a toggle so that after the initial degree of opening of the jaws has been effected at the appropriate time by the said cam or other means, the spring means completes the opening of the jaws and holds the same open during their passage over the sprocket wheels and the upper runs of the chains until the appropriate time when the jaws are initially closed by further cam or other means, the spring means completing the closing of the jaws on to the material being measured.

The device has the advantages of simplicity in operation, simplicity and cheapness in manufacture, and a high degree of accuracy in measurement due to the fact that several members or jaws are in gripping engagement with the material at any one moment, thereby guarding against the possibility of the material slipping with respect to the measuring chains.

I claim:

1. A device for measuring the length of continuous lengths of material, comprising a measuring member consisting of two endless link chains, a shaft, two sprocket wheels fixed to said shaft for rotation therewith, a part in which said shaft is rotatably mounted, a second shaft, two further sprocket wheels fixed to said second shaft for rotation therewith, a second part in which said second shaft is rotatably mounted, the shaft axes being parallel, one endless link chain being for running on a pair of said sprocket wheels, the other endless link chain being for running on the other pair of said sprocket wheels, the first-named part being slidable on the second part, spring means for resiliently urging said parts away from one another for tensioning said endless link chains, connecting parts for connecting said endless link chains, converging portions of each connecting part, and means for causing gripping engagement by a wedging action between said portions and said material for causing parts of said endless link chains to move along a path substantially parallel to the material being measured as the material moves longitudinally relative to the said device.

2. A device for measuring the length of continuous lengths of material, comprising a measuring member consisting of two endless link chains, a shaft, two sprocket wheels fixed to said shaft for rotation therewith, a part in which said shaft is rotatably mounted, a second shaft, two further sprocket wheels fixed to said second shaft for rotation therewith, a second part in which said second shaft is rotatably mounted, the shaft axes being parallel, one endless link chain being for running on a pair of said sprocket wheels, the other endless link chain being for running on the other pair of said sprocket wheels, the first-named part being slidable on the second part, spring means for resiliently urging said parts away from one another for tensioning said endless link chains, outer links of each endless link chain on opposed sides thereof, a lateral arm of each outer link, a V-shaped part secured at its ends to each pair of opposed arms for connecting said endless link chains, and means for causing gripping engagement by a wedging action between V-shaped parts and said material for causing parts of said endless link chains to move along a path substantially parallel to the material being measured as the material moves longitudinally relative to the said device.

3. A device for measuring the length of continuous lengths of material, comprising a measuring member consisting of two endless link chains, a shaft, two sprocket wheels fixed to said shaft for rotation therewith, a part in which said shaft is rotatably mounted, a second shaft, two further sprocket wheels fixed to said second shaft for rotation therewith, a second part in which said second shaft is rotatably mounted, the shaft axes being parallel, one endless link chain being for running on a pair of said sprocket wheels, the other endless link chain being for running on the other pair of said sprocket wheels, the first-named part being slidable on the second part, spring means for resiliently urging said parts away from one another for tensioning said endless link chains, outer links of each endless link chain on opposed sides thereof, a lateral arm of each outer link, connecting parts connecting each pair of opposed arms for connecting said endless link chains, converging portions of each connecting part, material engaging members on each converging portion of each connecting part, serrations on the material engaging surface of each material engaging member, and means for causing gripping engagement by a wedging action between material engaging members and said material for causing parts of said endless link chains to move along a path substantially parallel to the material being measured as the material moves longitudinally relative to the said device.

4. A device for measuring the length of continuous lengths of material, comprising a measuring member consisting of two endless link chains, a shaft, a revolution counter connected to said shaft, two sprocket wheels fixed to said shaft for rotation therewith, a part in which said shaft is rotatably mounted, a second shaft, two further sprocket wheels fixed to said second shaft for rotation therewith, a second part in which said second shaft is rotatably mounted, the shaft axes being parallel, one endless link chain being for running on a pair of said sprocket wheels, the other endless link chain being for running on the other pair of sprocket wheels, rods of the first-named part for sliding engagement in apertures of said second part, the axes of said apertures being parallel to said endless link chains, compression springs on said rods for urging said parts away from one another for tensioning said endless link chains, outer links of each endless link chain on opposed sides thereof, a lateral arm of each outer link, connecting parts connecting each pair of opposed arms for connecting said endless link chains, converging portions of each connecting part, a material engaging surface on each converging portion, each connecting part having its converging portions converging inwardly, means including spring means for causing gripping engagement by a wedging action between said material engaging surfaces on the lower runs of the endless link chains and said material to be measured, and means for holding said device stationary relative to said material as said material moves longitudinally relative to the device, said material as it moves causing the lower runs of said endless links chains to move along a path substantially parallel to the material.

References Cited in the file of this patent

UNITED STATES PATENTS

| | | |
|---|---|---|
| 1,095,160 | Kessler | Apr. 28, 1914 |
| 1,415,483 | Reichman | May 9, 1922 |
| 1,461,758 | Hosford | July 17, 1923 |
| 1,579,260 | Tiller | Apr. 6, 1926 |
| 2,081,102 | Blue | May 18, 1937 |

FOREIGN PATENTS

| | | |
|---|---|---|
| 626,185 | Germany | Feb. 21, 1936 |